United States Patent
Li

(10) Patent No.: US 6,412,405 B1
(45) Date of Patent: Jul. 2, 2002

(54) PEELING DEVICE FOR THE INNER-EMBRYO MEMBRANE OF COFFEE BEAN

(76) Inventor: Yuan-Hong Li, No. 73, Zhong Xing Road, Chang-Hua City (TW)

( * ) Notice: Subject to any disclaimer, the term of this patent is extended or adjusted under 35 U.S.C. 154(b) by 49 days.

(21) Appl. No.: 09/767,746

(22) Filed: Jan. 24, 2001

(51) Int. Cl.[7] .............................. A23L 1/00; A23N 1/00; A47J 31/40; B02C 7/14; B02C 25/00
(52) U.S. Cl. .............................. 99/623; 99/286; 99/584; 99/601; 241/55; 241/81; 241/259.1; 241/261.2
(58) Field of Search .......................... 99/482, 484, 286, 99/293, 289 R, 601, 510, 495, 304, 307, 308, 584, 623–630; 100/96, 125, 145; 241/81, 259.1, 261.2, 261.3, 34–37, 55, 117, 65, 101.2, DIG. 38

(56) References Cited

U.S. PATENT DOCUMENTS

| | | | | |
|---|---|---|---|---|
| 5,673,862 A | * | 10/1997 | Wingler | 241/81 |
| 5,718,163 A | * | 2/1998 | Termini | 99/286 |
| 5,761,993 A | * | 6/1998 | Ling et al. | 99/510 |
| 5,865,095 A | * | 2/1999 | Mulle | 99/293 |
| 5,875,978 A | * | 3/1999 | Wingler et al. | 241/55 |
| 5,992,775 A | * | 11/1999 | Wingler et al. | 241/34 |
| 6,095,032 A | * | 8/2000 | Barnett et al. | 100/96 X |

\* cited by examiner

*Primary Examiner*—Timothy F. Simone

(57) ABSTRACT

A device inside a grinder to peel the inner embryo membrane of coffee beans is disclosed. It has a motor with a motor shaft, a positioning cylinder located on the lateral side of a motor and having a lower exit inside a conveyor base, and a conveyor base, which is on the lateral side of the grinder and has an extruded exit end on the other side of the grinder. The motor shaft connects to an eccentric synchronic rotation grinding bar. During rotation, the grinding surface completely hits the inner ring rim of the positioning cylinder and coffee beans are ground into particles. When the particles fall, due to low specific weight, the embryo membrane is drawn by a fan located on the lateral wall of a grinder and is collected in a dust collection bag.

3 Claims, 5 Drawing Sheets

PEELING DEVICE FOR THE INNER-EMBRYO MEMBRANE OF COFFEE BEAN

BACKGROUND OF THE INVENTION

1) Field of the Invention

A kind of device in peeling the inner embryo membrane for coffee beans is structurally characterized as an eccentric grinding bar on a motor shaft for synchronic rotation, an inclined conveyor platform on a conveyor base, and a fan on the lateral side of a grinder. When the motor shaft rotates, the grinding surface of the grinding bar completely hits the inner ring rim of a positioning cylinder and coffee beans are ground in particles. When grinding particles fall, due to low specific weight, the embryo membrane is sucked by the fan on the lateral wall of a grinder and is collected in a dust collection bag. Those particles not sucked out fall along the inclined conveyor platform on the conveyor base into a dust collection bag. After grinding, the separation of coffee particles and the membrane is fully achieved.

2) Description of the Prior Art

Normally, coffee bean should be dried, toasted and cooked in advance to form dry and crispy coffee beans. The beans will be ground into fine-shaped coffee particles (not powder). The invention, a peeling device for the inner embryo membrane of coffee bean, is to separate the bi-sectional coffee beans and the embryo membrane inside the bi-sectional coffee beans during the grinding process. When one makes coffee, most of the time, the bitter and astringent taste comes from the inner embryo membrane inside coffee beans. It is much time-consuming for manual separation of the coffee beans and the embryo membrane. Current grinding coffee making utilizes the whole pieces of coffee beans for grinding without peeling of the inner embryo membrane, therefore, additional bitter and astringent taste for the coffee is added. The original taste of sweet smell for the coffee is lessened.

SUMMARY OF THE INVENTION

The primary objective of the invention is to provide a kind of device to peel off the inner embryo membrane on the coffee beans. It comprises of a motor equipping a shaft in the center, a positioning cylinder on the lateral side of the motor and a lower exit inside the conveyor base, and a conveyor base on the lateral side of the grinder and an exit end extruded on the other side the grinder. There is a synchronic eccentric grinding bar on the motor shaft. Therefore, during rotation, the bar is in a state of eccentricity. The eccentric grinding bar hits exactly the inner rim of the positioning cylinder, thus, coffee beans are ground in particles. There is an inclined conveyor platform on the conveyor base. The ground particles fall and the inner embryo membrane is sucked by a fan on the lateral wall of the grinder into a dust collection bag due to low specific weight. The particles not sucked out fall along the inclined conveyor platform into a material collection bag. Thus, after grinding, the coffee particles and inner embryo membrane are completely separated and the objective of eliminating coffee bitter and astringent is achieved.

On the basis of constant research and improvement, the inventor finally developed the invention.

The followings are brief description and legend for optimal embodiments of the invention for committee's better understanding in the structural characteristics and operations of the invention.

DETAILED DESCRIPTION OF THE PREFERRED EMBODIMENT

Figure 1:
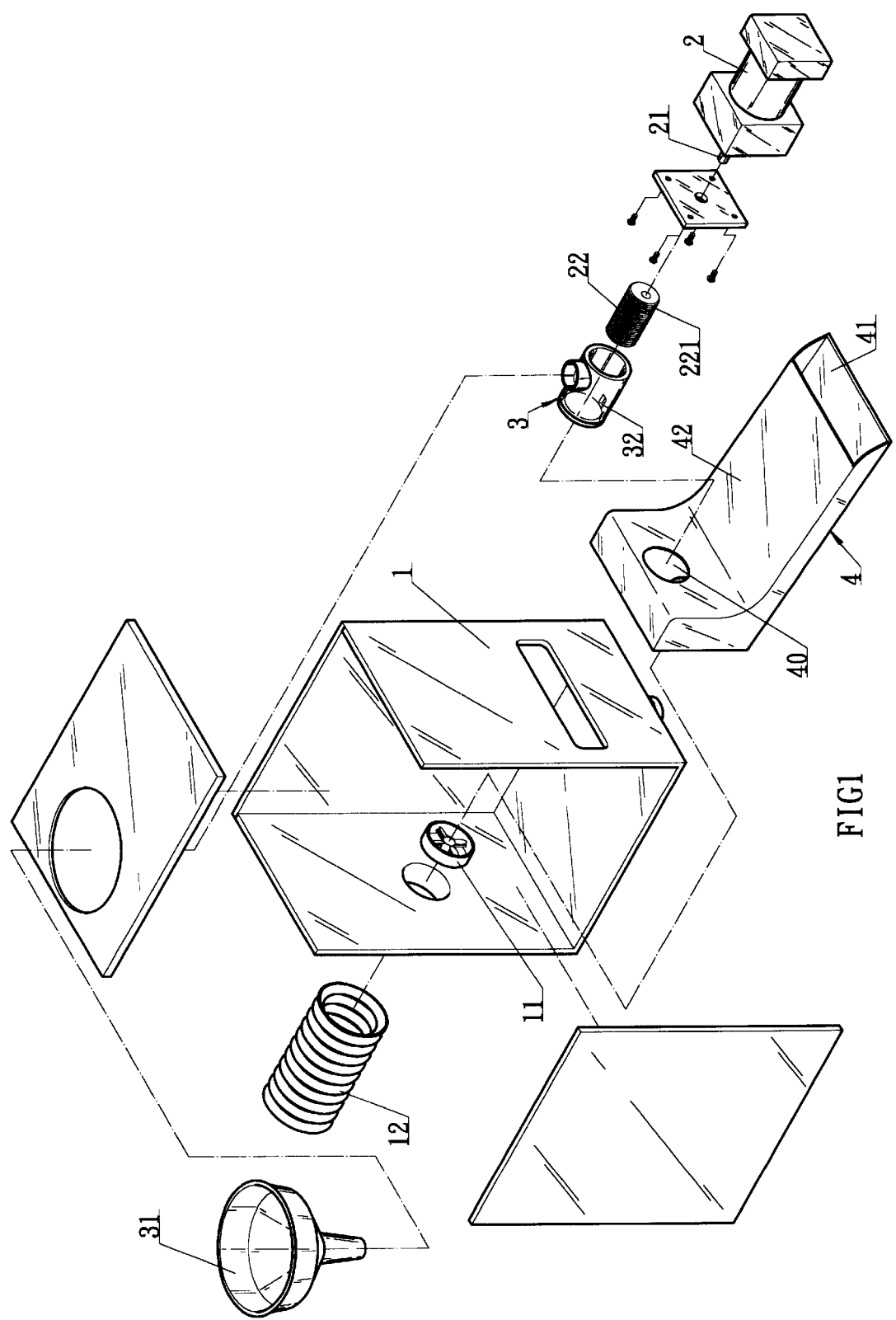
FIG. 1 is the exploded drawing of the invention.
Figure 2:
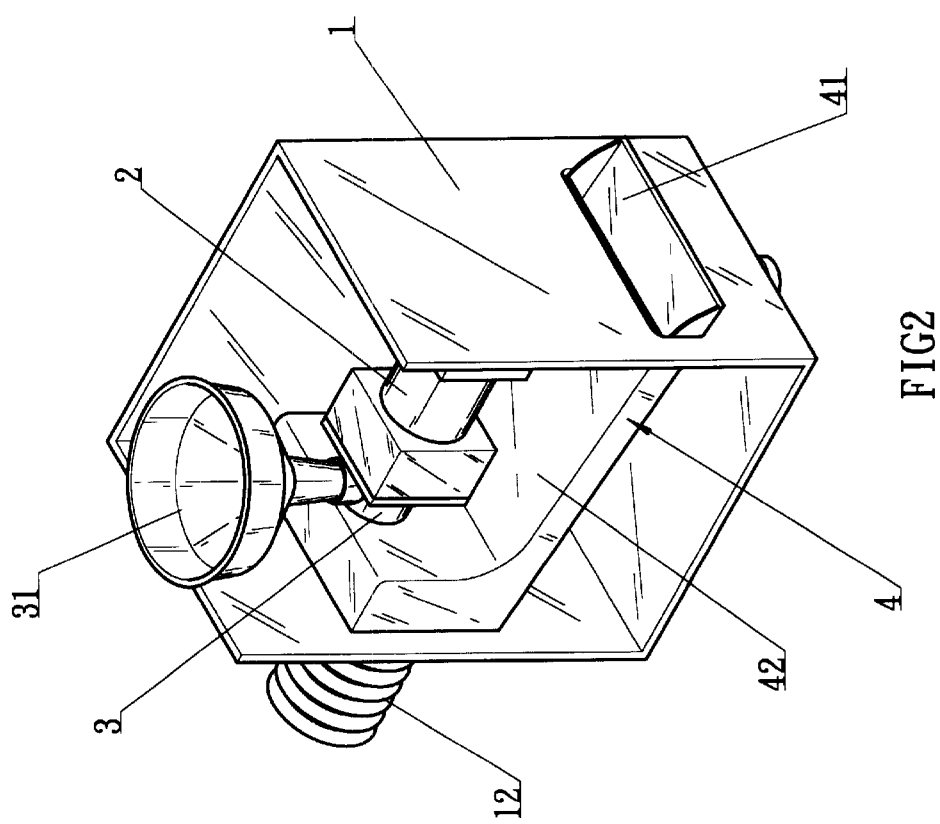
FIG. 2 is an isometric assembly drawing of the invention.
Figure 3:
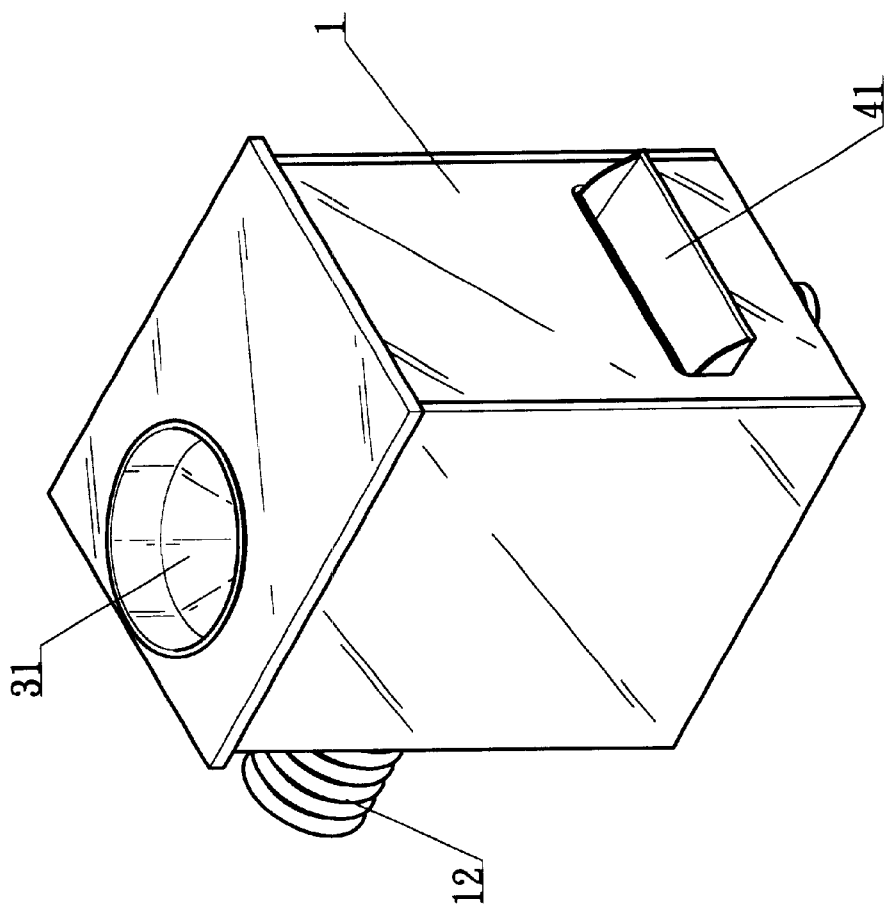
FIG. 3 is an internal isometric drawing of the invention.

Please refer FIG. 1 through 3 for the comprehension of the structural state of the invention. It mainly comprises of a motor 2 on the proper location of the internal wall for a grinder 1, a positioning cylinder 3 on the lateral side of the motor, and a positioning conveyor base 4, which is empty and is equipped for the penetration of a positioning cylinder 3 from the lateral side. The center of the motor 2 extrudes a motor shaft 21 connecting an eccentric grinding bar 22 with synchronic rotation. The eccentric grinding bar 22 fits exactly the positioning cylinder 3. There are grinding threads 221 on the grinding bar 22, thus, grinding compression occurs between the bar and inner rim of the positioning cylinder 3 during rotation.

The top of the positioning cylinder 3 is connected to a funnel-shaped loading container 31, which is externally connected. On the proper location of the bottom of the positioning cylinder 3, there is a grinding particle exit 32. The lateral rim of the positioning cylinder 3 extrudes the piecing hole 40 on the conveyor base 4. The lower exit 32 on the positioning cylinder 3 is located exactly inside the empty conveyor base 4.

The conveyor base 4 is in empty base structure. Its lateral end is connected to the lateral wall of the grinder 1. The other end of the grinder extrudes an exit end 41. The conveyor platform 42 on the conveyor base 4 is in inclined structural state, thus after the ground particles R are peeled, the particles fall smoothly from the exit end 41 to a material collection bag 43.

On the lateral wall of the grinder 1 near the lower falling position of ground particles, there is a fan 11. After peeling, the embryo membrane will be sucked out and the grinding particles fall form the inclined plane of the conveyor base 4 to enter the dust collection bag 43. Through a snake-shaped tube 12, the exit end of the fan 11 is connected to the duct collection bag 13 in collecting embryo membrane.

Figure 4:
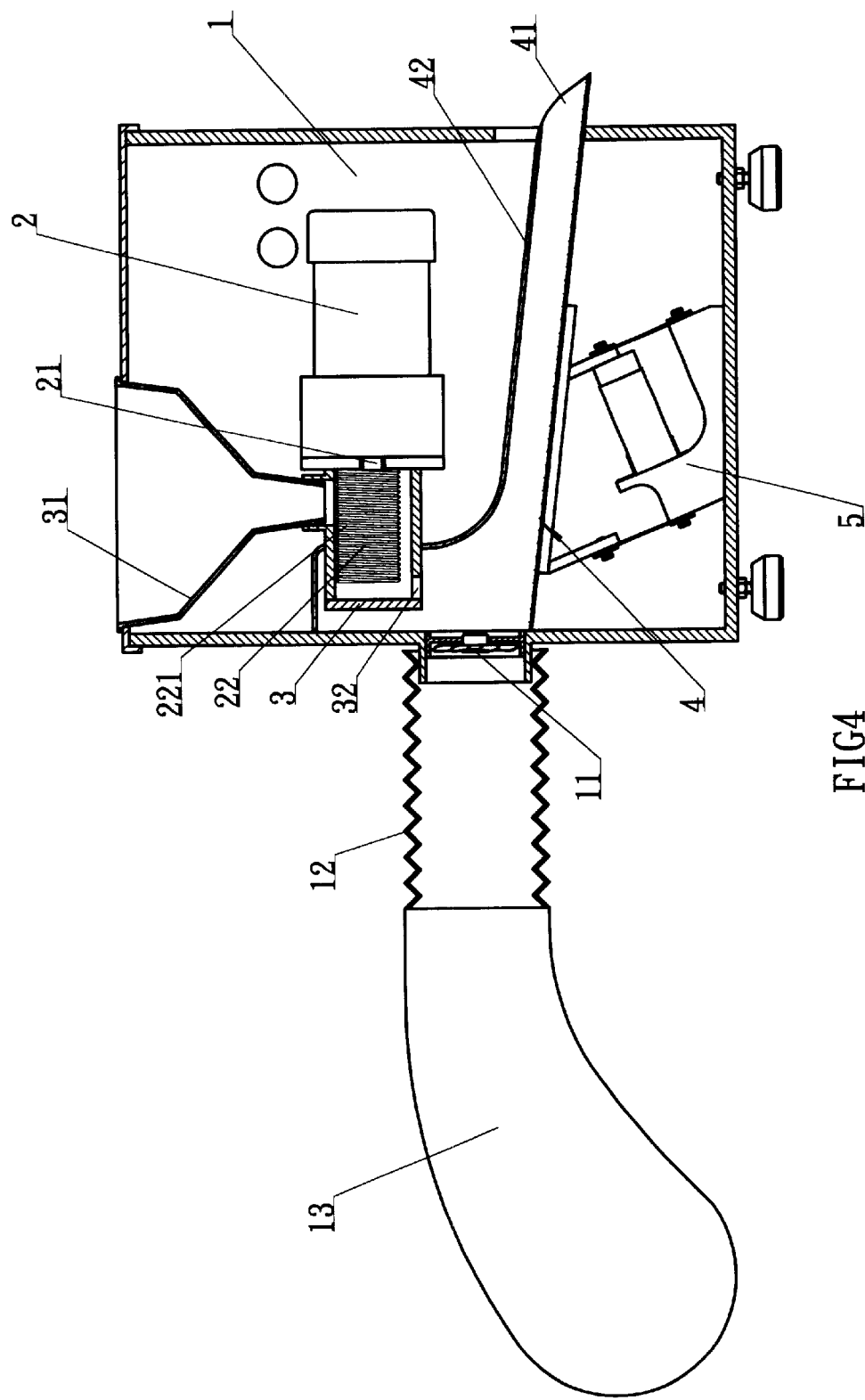
FIG. 4 is a planar embodiment drawing of the invention.
Figure 5:
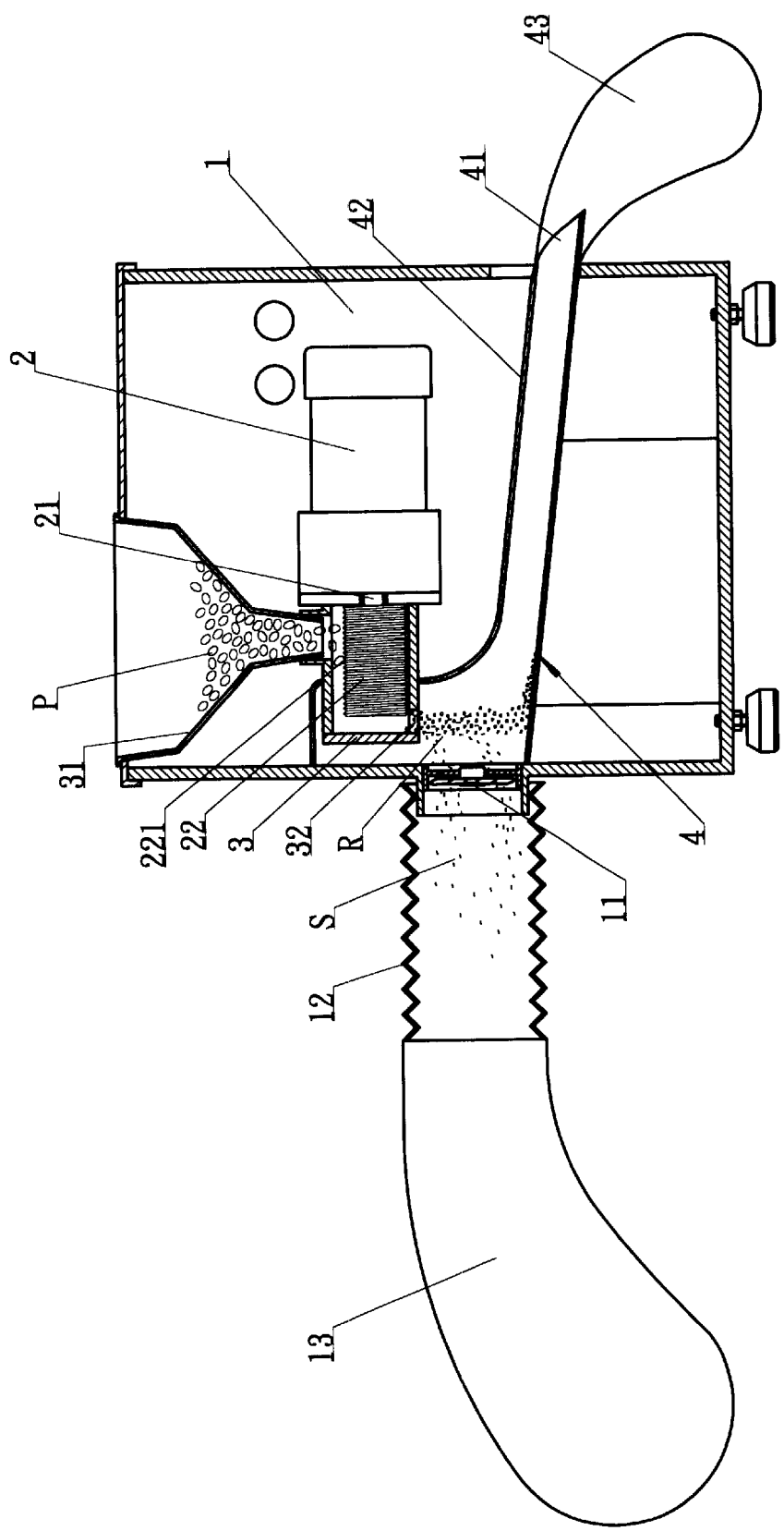
FIG. 5 is a drawing of grinding process embodiment for the invention.

Please refer to FIGS. 4 and 5, when coffee beans fall into loading container 31 and distribute inside positioning cylinder, the shaft 21 of a motor rotates together with the grinding shaft 22. Because the grinding bar 22 is in eccentric bar structure, the grinding bar 22 is in eccentric state when it rotates with the motor shaft. The grinding face hits the inner rim of the positioning cylinder 3 with compression. After the repetitive grinding and compression between the grinding threads 22 on the grinding bar 22, coffee beans are evenly crushed. Then, the grinding particle are gradually pushed to the end of the grinding bar 22, therefore, the ground particles R fall from the loading container 32 on the bottom of the positioning cylinder 3. Because coffee beans are ground in particles, the embryo membrane S inside coffee beans are peeled from semi-sphere coffee beans. During the falling process prior to entering the collection bag, because the gravity of inner embryo membrane S is less than that of the particle R, the membrane is sucked form the fan 11 on the lateral wall of the grinder 1 and is collected into a dust collection bag 13. The particle not sucked out will fall along the inclined platform 42 on the conveyor base 4 into the material collection bag 43.

Please refer FIG. 4. A vibration structure 5 can be equipped on the bottom of the conveyor base 4 of the grinder 1. By the aid the vibration structure 5, the fluidity smooth of grinding particle on the conveyor platform 42 of the conveyor base 4 is guaranteed to avoid particle blockage on the conveyor platform 42.

The above explanation is a substantial embodiment of the invention, which provides greater practical performance and simplification than products of prior art. Furthermore, the present invention meets all new patent application requirements and is lawfully submitted for review and the granting of the commensurate patent rights to thereby encourage the spirit of invention and its rightful protection under the patent law.

What is claimed is:

1. A device to peel off inner embryo membranes on coffee beans, comprising: a grinder; a motor located on an internal wall of the grinder; a positioning cylinder mounted on a lateral side of the motor; a conveyor base, into which the positioning cylinder extends; a motor shaft extending from the motor and connected to an eccentric grinding bar for eccentric rotation of the grinding bar, the grinding bar fitting into the positioning cylinder and having grinding threads thereon such that grinding compression occurs between the grinding bar and an inner rim of the positioning cylinder; a top of the positioning cylinder connected to a funnel-shaped loading container, and a bottom of the positioning cylinder, having a grinding particle exit located inside the conveyor base; a lateral end of the conveyor base connected to a lateral wall of the grinder and an opposite lateral end of the grinder forming an exit end, the positioning conveyor being inclined such that ground coffee particles fall into the inclined positioning conveyor; and a fan on a lateral side of the grinder positioned so as to draw out inner embryo membranes after passing through the grinding particle exit.

2. The device of claim 1 wherein the fan has an exit end and further comprising a duct collection bag connected to the exit end of the fan to collect inner embryo membranes.

3. The device of claim 1 further comprising a vibration structure on a bottom of the conveyor base.

\* \* \* \* \*